United States Patent
Heiduczek et al.

(10) Patent No.: US 11,840,298 B2
(45) Date of Patent: Dec. 12, 2023

(54) DEVICE FOR MEASURING AND ADJUSTING THE PARAMETERS OF THE CHASSIS GEOMETRY AT A REAR AXLE OF A MOTOR VEHICLE

(71) Applicant: DÜRR Assembly Products GmbH, Saarbrücken (DE)

(72) Inventors: Gerhard Heiduczek, Riegelsberg (DE); Alexander Bauer, Illingen (DE); Ismail Kurt, Völklingen (DE)

(73) Assignee: DURR ASSEMBLY PRODUCTS GMBH, Puttlingen (DE)

( * ) Notice: Subject to any disclaimer, the term of this patent is extended or adjusted under 35 U.S.C. 154(b) by 634 days.

(21) Appl. No.: 16/646,669

(22) PCT Filed: Sep. 13, 2018

(86) PCT No.: PCT/DE2018/100778
§ 371 (c)(1),
(2) Date: Mar. 12, 2020

(87) PCT Pub. No.: WO2019/052606
PCT Pub. Date: Mar. 21, 2019

(65) Prior Publication Data
US 2020/0369335 A1     Nov. 26, 2020

(30) Foreign Application Priority Data
Sep. 13, 2017   (DE) .......................... 102017121220.5

(51) Int. Cl.
*B62D 65/12*    (2006.01)
*B23P 21/00*    (2006.01)
(Continued)

(52) U.S. Cl.
CPC ............. *B62D 65/18* (2013.01); *B62D 65/12* (2013.01); *B23P 21/004* (2013.01);
(Continued)

(58) Field of Classification Search
CPC ....... B21P 21/004; B62D 65/18; B62D 65/12; B62D 65/022; B23P 21/004;
(Continued)

(56) References Cited

U.S. PATENT DOCUMENTS 4,734,979 A * 4/1988 Sakamoto .............. B62D 65/18
29/430
4,738,022 A * 4/1988 Sakamoto .............. B62D 65/02
29/430
(Continued)

FOREIGN PATENT DOCUMENTS

| DE | 19636427 A1 | 7/1997 |
|---|---|---|
| DE | 102005053370 A1 | 9/2006 |
| DE | 102013114579 A1 | 6/2015 |

*Primary Examiner* — Sarang Afzali
*Assistant Examiner* — Darrell C Ford
(74) *Attorney, Agent, or Firm* — Gregory D. Degrazia; MILLER, CANFIELD, PADDOCK AND STONE

(57) ABSTRACT

The invention relates to a device for measuring and adjusting the parameters of the chassis geometry at a rear axle of a motor vehicle on a production line for the motor vehicle. Gripping and holding means for the rear axle and loading means for the rear axle are associated with the production line. According to the invention, a plurality of interchangeable frames is associated with the production line, and positioning means for positioning one of the interchangeable frames into a position for gripping the rear axle in the production process are associated with the production line. The gripping and holding means for the rear axle and the loading means for the rear axle are associated with the interchangeable frame in question. The interchangeable frames can thereby be matched to rear axles of different vehicle types, such that these different rear axles can be processed in one assembly line.

7 Claims, 1 Drawing Sheet

(51) Int. Cl.
  *B62D 65/02* (2006.01)
  *B62D 65/18* (2006.01)
(52) U.S. Cl.
  CPC ........ *B23P 2700/50* (2013.01); *B62D 65/022* (2013.01); *B65G 2201/0294* (2013.01)
(58) Field of Classification Search
  CPC ......... B23P 2700/50; B65G 2201/0294; G01B 21/26; G01B 5/255
  USPC .......................................................... 29/430
  See application file for complete search history.

(56) References Cited

U.S. PATENT DOCUMENTS

| | | | | |
|---|---|---|---|---|
| 4,901,560 A * | 2/1990 | Hirano | .................... | G01B 5/255 |
| | | | | 33/203.13 |
| 4,928,386 A * | 5/1990 | Schupp | .................. | B62D 65/10 |
| | | | | 108/138 |
| 5,090,105 A * | 2/1992 | DeRees | ................. | B62D 63/025 |
| | | | | 29/469 |
| 5,125,298 A * | 6/1992 | Smith | .................... | B23P 19/069 |
| | | | | 81/57.35 |
| 8,807,631 B2 * | 8/2014 | Grevener | ............. | B62D 63/025 |
| | | | | 296/193.07 |
| 11,446,958 B2 * | 9/2022 | Downey | ................. | B25J 11/008 |
| 2003/0094319 A1 * | 5/2003 | Chernoff | .................... | B60T 7/00 |
| | | | | 180/54.1 |
| 2007/0180675 A1 * | 8/2007 | Tsujihama | ............. | B62D 65/12 |
| | | | | 29/897.2 |
| 2009/0288305 A1 * | 11/2009 | Tentrup | .................. | G01B 5/255 |
| | | | | 33/203.12 |
| 2014/0007432 A1 * | 1/2014 | Grevener | ............... | B62D 65/12 |
| | | | | 29/897.2 |
| 2014/0082918 A1 * | 3/2014 | Grevener | ............... | B62D 65/04 |
| | | | | 29/469 |
| 2017/0089687 A1 * | 3/2017 | Nourdine | ................ | B60B 27/00 |
| 2018/0273243 A1 * | 9/2018 | Kilibarda | .......... | B23K 37/0426 |
| 2022/0348277 A1 * | 11/2022 | Harmon | ................ | B62D 65/12 |

\* cited by examiner

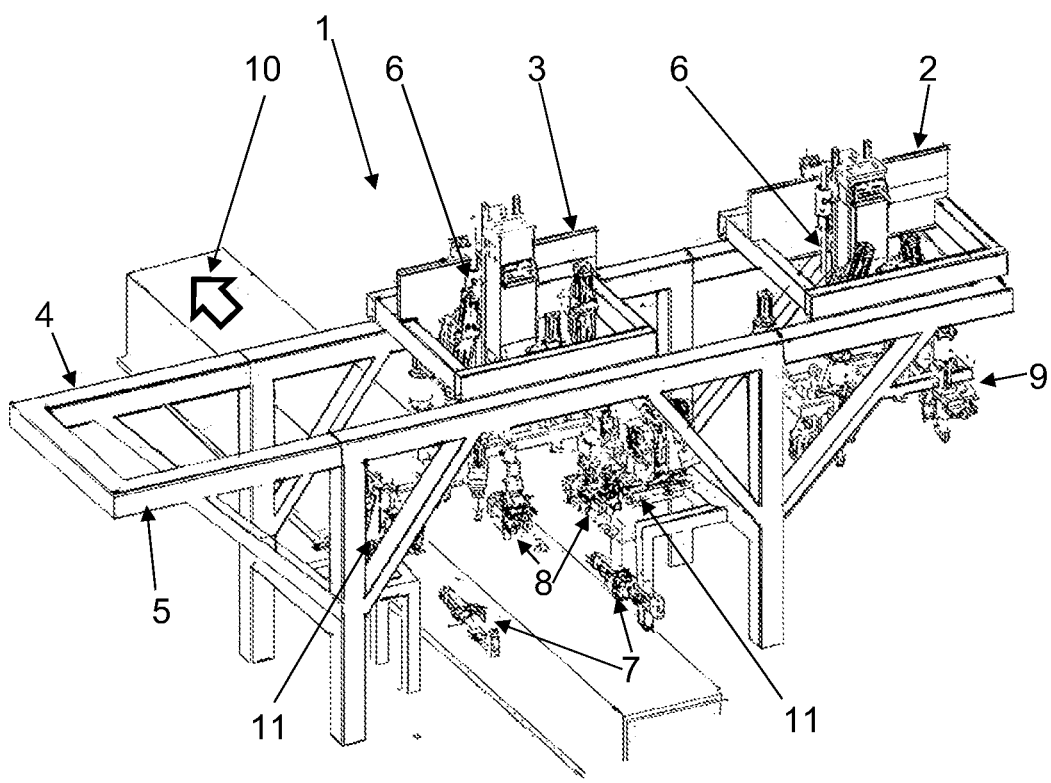

DEVICE FOR MEASURING AND ADJUSTING THE PARAMETERS OF THE CHASSIS GEOMETRY AT A REAR AXLE OF A MOTOR VEHICLE

The present application claims priority to International Patent Application No. PCT/DE 2018/100778 filed on Sep. 13, 2018, which claims priority to German Patent Application No. DE10217121220.5 filed on Sep. 13, 2017, the contents of which are each included herein by reference.

TECHNICAL FIELD

The present invention relates to a production line for a motor vehicle according to the preamble of claim 1.

BACKGROUND

The parameters of the chassis geometry relate to the adjustment of the toe and camber angle of the wheels of the rear axle. It is known to measure and adjust said angles in the case of a mounted rear axle on the (at least largely) fully mounted vehicle. In this procedure, the rear axle has the weight load that also results in the following vehicle operation, as a result of the weight of the vehicle.

It is also known, in the ongoing production process, to grip and bear the (not mounted) rear axle, and to furthermore provide loading means which simulate a weight load of the vehicle on the rear axle.

It is known to measure the orientation of the wheel plane using optical measuring means. In this case, a required compensation value of the adjustment of the parameters of the chassis geometry can be determined, which value can be displayed as the compensation value for the operation of adjustment tools for operating the adjustment means of the rear axle for adjusting the parameters of the chassis geometry. Likewise, the compensation value can also be supplied to the automatically operated adjustment tools, in the case of automated adjustment.

It is also known (DE 10 2013 114 579 A1) to provide gripping and holding means as adjustment tools for the parameters of the chassis geometry, which means grip and hold the rear axle at the wheel hub and/or the brake discs and/or optionally an adapter disc which may be provided. Said gripping and holding means are adjustable in a defined manner, relative to the bearing of the gripping and holding means, such that the orientation of the wheel hub, the brake disc and/or the adapter disc can be adjusted in such a way that said orientation corresponds to the parameters of the chassis geometry that are to be adjusted. In the case of this adjustment, the locking means on the rear axle are released in order to adjust the parameters of the chassis geometry. Once this adjustment of the parameters of the chassis geometry has been carried out, said locking means are tightened again. In the case of this embodiment, the gripping and holding means are the adjustment tools for the parameters of the chassis geometry and also the measuring means for the parameters of the chassis geometry. The parameters of the chassis geometry of the rear axle can be derived directly from a particular orientation of the gripping and holding means.

In a further known solution (DE 10 2005 053 370 A1), a plurality of positions are provided, at which the rear axles can be lifted out of the production line by means of a robot comprising a gripping arm, and can each be deposited on a frame. Said frames are erected along the production line. Each of said frames is adapted to a particular type of a rear axle. Different vehicle types have different rear axles. Therefore, if not just one vehicle type, but rather a plurality thereof, is manufactured in a production line, different types of rear axles also have to be handled. Following deposition in the relevant frame, the adjustment work on the rear axle is carried out. Subsequently, the rear axles are raised back into the production line again, by means of the robot.

This solution requires the production line to correspondingly long, in order that the individual frames can be arranged one behind the other (with respect to the transport direction of the rear axles along the production line). In addition to the associated space requirement for the production line, the cycle times in the ongoing production process also increase as a result. This is a result of each rear axle having to be transported along the production line, even on all the frames that are designed for other types of rear axles. In addition, spacings between the individual rear axles which are transported in the production process, must still be maintained in the conveying device, into which spaces rear axles can be placed by the robots, when the adjustment work on said rear axles in the frame has been completed, and said rear axle is intended to be transferred back into the ongoing production process.

SUMMARY

In the present invention, the production line for a motor vehicle is designed such that the measurement and adjustment of the parameters of the chassis geometry at the rear axle of the motor vehicle is integrated in the production line for the motor vehicle. The production line is assigned bearing means for the rear axle, loading means for the rear axle, measuring means for the parameters of the chassis geometry, as well as adjustment tools for adjusting the parameters of the chassis geometry.

The bearing means can consist of wheel hub gripping units. In addition, axle tensioners can also be provided, as a component of the bearing means, by means of which tensioners the axle body is fixed.

The loading means are the defined load of the rear axle for simulating the weight load, thereof in the installed state. In this case, it has been found to be advantageous that it is possible to adjust the parameters of the chassis geometry before mounting the rear axle on the vehicle. Said loading means arc designed as spring loading units which simulate weight forces, by means of springs, at points on the axle on which the spring means of the vehicle engage in the case of a mounted axle, This applies for conventional mechanical spring and also for pneumatic spring systems of vehicles. Advantageously, the spring loading means cooperate with the effective direction of the rear axle, as is also the case for a rear axle that is mounted on a vehicle.

The object of the present invention is that of being able to adjust axles of different vehicles, in a production line.

This object is achieved by the present invention in that the production line comprises a plurality of interchangeable frames, as well as positioning means for positioning one of the interchangeable frames in a position for gripping the rear axle, in the production process.

The bearing means for the rear axle, and/or the loading means for the rear axle, and/or the measuring means for the parameters of the chassis geometry, and/or the adjustment tools for adjusting the parameters of the chassis geometry are components of the relevant interchangeable frame, at least in part.

Said introduction of the interchangeable frame into the production line has been found to be advantageous.

It was hitherto necessary to provide bearing means, loading means, measuring means and adjustment tools in the production line, by means of which it is possible to handle all the rear axles in the production line this may appear when producing different vehicle types. In this case, depending on the different rear axles, and in particular the different design thereof, it was necessary to design said bearing means, loading means, measuring means and adjustment tools in the production line so as to be flexible.

The present invention makes it possible to integrate structural interfaces for handing the rear axles of different vehicle types into the relevant interchangeable frame, at least in part. The individual interchangeable frames in turn have standardized interfaces to the production line for the motor vehicle. In this case, the structural requirements for adapting the bearing means, loading means, measuring means and the adjustment tools to the individual rear axles of the different vehicle types are advantageously shifted into the interchangeable frames, at least in part.

Therefore, provided that the bearing means, loading means, measuring means and/or the adjustment tools are assigned to the interchangeable frame, in the present invention these are also directly assigned to the production line, since the interchangeable frame is in turn assigned to the production line.

In this case, the production line remains flexible with respect to the possibility of also being able to manufacture rear axles of different vehicle types, in direct succession, in the production line.

This is achieved by the positioning means. This makes it possible, in the production line, to insert exactly the correct interchangeable frame into the production line for the rear axle that follows in the production process.

The bearing means can for example be a component of the interchangeable frame merely in part, if the bearing means consist of a wheel hub gripping unit and an axle tensioner. The axle tensioner fixes the axle body. The wheel hub gripping units may be directly assigned to the production line. This has been found to be expedient insofar as only a small amount of structural outlay is required in order to form the wheel hub gripping unit such that different types of rear axles can be grasped thereby and borne by means of the wheel hub gripping unit. In this respect, it has been found to be expedient to assign said wheel hub gripping unit directly to the production line. In the different types of rear axles, the points of application of the axle tensioner have more or less significant variations in the x- and y-direction (x-direct: in the "direction of travel" of the installed axle; y-direction: in the longitudinal direction of the axle). It may therefore be expedient to assign said axle tensioner to the interchangeable frame. As a result, the axle tensioner in the relevant interchangeable frame can be designed and optimized to the rear axle type that is provided for the relevant rear axle. Therefore, in this solution, the bearing means are a component of the interchangeable frame only in part (specifically only the axle tensioner). In this case, it is clear that the wheel hub gripping unit can also be a component of the interchangeable frame. In this case, the bearing means are entirely a component of the interchangeable frame.

Similar also applies for the loading means, the measuring means and/or the adjustment tools. These, too, can be a component of the interchangeable frame entirely or in part, if they consist of a plurality of interacting components.

In particular, there is a smaller space requirement for the entire system, during production, compared with the solution according to DE 10 2005 053 370 A1, because the interchangeable frames are positioned such that the rear axles (in particular also the different types of rear axles) can in each case be set at the same location in the production line. Since the rear axles therefore no longer need to be transported along the production line, without adjustment work being carried out, the cycle times are also reduced. A further difference is that, in the case of DE 10 2005 053 370 A1, the rear axle is grasped by means of a robot arm and raised out of the production line. The rear axle is deposited on the matching frame, in each case, beside the production line. Whereas, in said cited prior art, the rear axle is raised to the frame, in the present invention the interchangeable frame is moved in the production line such that the relevant rear axle type can be processed.

Each interchangeable frame comprises adjustment tools for adjusting the parameters of the chassis geometry of the rear axle.

In the case of different points of application and/or different adjustment tools for operating adjustment means for the parameters of the chassis geometry, in different types of rear axles, this structural requirement can be implemented in the relevant interchangeable frame.

This can be achieved in that the drive of the adjustment tool, by means of which the adjustment means on the rear axle can be operated, is likewise integrated in the interchangeable frame.

Alternatively, this can also be achieved in that the interchangeable frames comprise standardized points of application and application elements, by means of which the adjustment tools of the relevant interchangeable frame are operable from the outside. In this embodiment, application elements may be integrated into the production line, by means of which elements the adjustment tools of the relevant interchangeable frame are operable. The interchangeable frame is, in turn, constructed such that the adjustment means for the parameters of the chassis geometry on the relevant rear axle are operable by means of the adjustment tools of the interchangeable frame.

Each interchangeable frame comprises adjustment tools which are operable by means of actuating elements and acct on the interchangeable frame from the outside.

As already explained, said actuating elements are components of the production line. The structural outlay for said actuating elements is restricted to the requirement that said actuating elements must engage on the standardized interfaces of the interchangeable frame. As a result, said actuating elements do not have to be as flexible as is the case when the adjustment means of different types of rear axle have to be directly operable by means of said actuating elements.

A data reception unit is a component of the interchangeable frame, by means of which data reception unit information relating to the parameters of the chassis geometry to be adjusted can be transmitted to the interchangeable frame.

Said data transmission may take place in a wired or wireless manner.

It has been found to be advantageous if the relevant interchangeable frame comprises its own drive unit for driving the adjustment tools for actuating the adjustment means of the parameters of the chassis geometry. An embodiment of this kind means that the interfaces of the interchangeable frame can be easily developed for the production line. However, this solution requires the use of a plurality of structural parts in the interchangeable frame.

In the embodiment according to FIG. 5, the interchangeable frame comprises bearing means for the rear axle, by means of which the rear axle can be gripped at the wheel hubs and/or the brake discs and/or an adapter disc, wherein the bearing means comprise actuating elements, by means of which the orientation of the wheel hub and/or of the brake disc and/or of the adapter disc can be adjusted according to the parameters of the chassis geometry by means of a corresponding adjustment of the orientation of the bearing means and, in the case of released locking means, the adjustment of the parameters of the chassis geometry at the rear axle.

This embodiment has been found to be advantageous insofar as, in this case, no separate optical measuring means need to be provided for optical measurement of the parameters of the chassis geometry. The defined adjustment of the orientation of the bearing means, relative to the bearing thereof, makes it possible to adjust the wheel plane of the wheels of the rear axle in accordance with the target values of the parameters of the chassis geometry. In this respect, in this embodiment the bearing means are simultaneously also the measuring means.

In order that the wheel hub, the brake disc, and/or the adapter disc can follow the adjustment of the orientation of the gripping and holding means, the adjustment of the orientation of the bearing means takes place when the locking means for adjusting the parameters of the chassis geometry are released. When the adjustment of the parameters of the chassis geometry has ended, the locking means are tightened again, and the adjustment is thus fixed.

The actuating elements for the bearing means can be integrated in the relevant interchangeable frame. It is likewise possible for application elements to be provided on the relevant interchangeable frame, at defined points of application of the interchangeable frame. It is then possible to carry out the adjustment of the parameters of the chassis geometry, by means of engagement on said application points from the outside, and as a result the adjustment of the orientation of the bearing means is carried out.

The production line comprises guide means for guided movement of the interchangeable frames in the horizontal plane, in a direction perpendicular to the movement direction of the transportation of the rear axle in the production line.

This has been found to be advantageous since, in this case, the interchangeable frames can be supplied in a simple manner.

The interchangeable frame further comprises measuring means for measuring the mounting position of a rear axle differential.

This has been found to be advantageous because, as a result, the measuring means do not have to be constructed in a manner directly assigned to the production line, such that all types of rear axles can be measured. In this embodiment, the adjustment to the relevant rear axle type advantageously takes place in the interchangeable frame.

BRIEF DESCRIPTION OF THE DRAWINGS

Other advantages of the present invention will be readily appreciated as the same becomes better understood by reference to the following detailed description, when considered in connection with the accompanying drawing, wherein:

The FIGURE shows a portal system 1 in a production line for a motor vehicle.

DETAILED DESCRIPTION

An embodiment of the invention is shown in the drawing. The FIGURE shows a portal system 1 in a production line for a motor vehicle. A measurement and adjustment of the parameters of the chassis geometry at the rear axle of the vehicle takes place at the portal system 1.

The rear axles are transported in the production line, in that the rear axles are laid on a pallet that is moved in the production line. (Arrow direction 10).

The parameters of the chassis geometry at the rear axle of the vehicle are intended to be adjusted at the portal system 1.

For this purpose, interchangeable frames 2, 3, are provided. Each of said interchangeable frames 2, 3 is adapted to the rear axle of a vehicle.

If, in the production line, a rear axle of a particular vehicle type is transported to the portal system 1, the associated interchangeable frame 2, 3 is positioned at the corresponding position of the portal system 1 which is located in the production line. In the drawing of FIG. 1, the interchangeable frame 3 is in said position.

Positioning means are provided, by means of which the interchangeable frames 2, 3 can be moved along the carriers 4, 5 of the portal system 1. If, in the production line, a rear axle of a vehicle type is transported to the portal system 1, which vehicle type is assigned to the interchangeable frame 2, the interchangeable frame 3 is pushed to the side of the carriers 4, 5 on which, in the drawing of FIG. 1, no interchangeable frame is positioned. As a result, space becomes free in the portal system, such that the interchangeable frame 2 can be pushed along the carriers 4, 5 of the portal system 1, to the position in which the rear axle of the vehicle can be gripped and held by means of said interchangeable frame.

As discussed in the introductory part of the description, there are different possibilities for adjusting the parameters of the vehicle geometry at the rear axle. The adjustment tools can, as already known, be arranged on the production line, such that, by way of corresponding adjustment positions for adaptation to different rear axles, said tools can be used. It is also possible to provided standardized interfaces on the interchangeable frame, for the application of actuating elements from the outside. Said actuating elements engage on standard interfaces of the interchangeable frames, in order to thereby actuate the adjustment tools which are integrated in the interchangeable frame and thus assigned to said interchangeable frame. The adjustment tools then do not, as a whole, have to be adapted to the individual rear axles, in the direct assignment thereof to the production line. The structural adaptation of the adjustment tools to the relevant rear axle takes place in the interchangeable frame. Standardized interfaces of the interchangeable frames make it possible for said adjustment tools to be operated, by means of the actuation means for the adjustment tools, in a manner that is simpler in terms of design. Said actuation means are directly assigned to the production line. Since the actuation means and the adjustment tools interact, as a result the adjustment tools are assigned to the interchangeable frame merely in part. It is thus possible, in a simple manner, to also integrate new rear axles into the production process, in a simple manner, because the adaptation to new rear axles takes place by means of a new interchangeable frame being added to the production line, which frame in turn comprises the standardized interfaces "towards the production line". This also applies if the adjustment tools for the parameters of the chassis geometry are fully integrated into the interchangeable frames. Data are supplied to the interchangeable frame, by means of which data the adjustment tools are actuated such that the corresponding parameters of the chassis geometry are adjusted.

In the drawing of the FIGURE, wheel hub gripping units 11 are assigned to the production line, as a component of the bearing means of the rear axle. In this embodiment, the optical measuring means are also assigned to the production line, as a structural component of the wheel hub gripping unit 11.

Tracking devices 7 are provided as adjustment tools. Instead of said tracking devices 7, "Hold & Drive" adjustment units (reference sign 8) may also be provided, as adjustment tools for the toe angle.

Spring loading units 6 are integrated in the relevant interchangeable units 2 and 3, which are in each case adapted, in the individual interchangeable frames 2, 3, to the rear axle type.

Furthermore, axle tensioners 9 are also integrated in the interchangeable frames 2, 3, which axle tensioners interact with the wheel hub gripping units 11 and form the bearing means for the rear axle.

The invention has been described in an illustrative manner, and it is to be understood that the terminology that has been used is intended to be in the nature of words of description rather than of limitation. Obviously, many modifications and variations of the present invention are possible in light of the above teachings. It is therefore to be understood that within the specification, the reference numerals are merely for convenience, and are not to be in any way limiting, and that the invention may be practiced otherwise than is specifically described. Therefore, the invention can be practiced otherwise than is specifically described within the scope of the intended claims.

The invention claimed is:

1. A production line for a motor vehicle, wherein parameters of a chassis geometry at a rear axle of a motor vehicle are measured and adjusted in the production line, wherein the parameters of the chassis geometry include the adjustment of the toe and camber angle of the wheels at the rear axle, the production line comprising bearing means (11, 9) for the rear axle which are assigned to the production line, comprising loading means (6) for the rear axle which are assigned to the production line, comprising measuring means for the parameters of the chassis geometry which are assigned to the production line, and comprising adjustment tools (7, 8), assigned to the production line, for adjusting the parameters of the chassis geometry;
characterized in that the production line comprises a position for bearing a rear axle in the production line, in that the production line comprises a plurality of interchangeable frames (2, 3), in that the production line comprises positioning means for positioning one interchangeable frame of the plurality of interchangeable frames (3) in the position for bearing a rear axle, in the production process (4, 5), wherein the bearing means (11, 9) for the rear axle, and/or the loading means (6) for the rear axle, and/or the measuring means for the parameters of the chassis geometry, and/or the adjustment tools (7, 8) for adjusting the parameters of the chassis geometry are components of a relevant interchangeable frame (2, 3) of the plurality of interchangeable frames, at least in part.

2. The production line according to claim 1,
characterized in that each interchangeable frame (2, 3) of the plurality of interchangeable frames comprises the adjustment tools for adjusting the parameters of the chassis geometry of the rear axle.

3. The production line according to claim 2,
characterized in that the adjustment tools of the relevant interchangeable frame (2, 3) of the plurality of interchangeable frames are operable by means of actuating elements which act on the interchangeable frame from outside of the interchangeable frame.

4. The production line according to claim 2,
characterized in that the interchangeable frame (2, 3) comprises a data reception unit, by means of which information relating to the parameters of the chassis geometry to be adjusted can be transmitted to the interchangeable frame (2, 3).

5. The production line according to claim 4,
characterized in that the interchangeable frame (2, 3) comprises bearing means for the rear axle, by means of which the rear axle can be gripped at wheel hubs or brake discs or adapter discs, wherein the bearing means comprise actuating elements, by means of which the orientation of the wheel hub or of the brake disc or of the adapter disc can be adjusted according to the parameters of the chassis geometry by means of a corresponding adjustment of the orientation of the bearing means and, in the case of released locking means, the adjustment of the parameters of the chassis geometry at the rear axle.

6. The production line according to claim 5,
characterized in that the positioning means in the production line for positioning one interchangeable frame of the plurality of interchangeable frames (3) in the position for bearing a rear axle are built by guide means (4, 5) for guided movement of the interchangeable frames (2, 3) in the horizontal plane, in a direction perpendicular to a movement direction (10) of the transportation of the rear axle in the production line.

7. The production line according to claim 6,
characterized in that the interchangeable frame (2, 3) further comprises measuring means for measuring the mounting position of a rear axle differential.

* * * * *